United States Patent [19]

Tsai

[11] Patent Number: 4,755,005
[45] Date of Patent: Jul. 5, 1988

[54] AXLE-VARIATING MEANS FOR ECCENTRIC AND CONCENTRIC WHEEL

[76] Inventor: Chao-Hsiung Tsai, P.O. Box 10160, Taipei, Taiwan

[21] Appl. No.: 43,956

[22] Filed: Apr. 29, 1987

[51] Int. Cl.⁴ .................. B60B 27/00; B62M 1/00
[52] U.S. Cl. .................... 301/1; 301/105 B; 280/229
[58] Field of Search ............ 301/1, 5 R, 105 B; 280/229; 180/905, 906

[56] References Cited

U.S. PATENT DOCUMENTS

| | | | |
|---|---|---|---|
| 605,182 | 6/1898 | Johnston | 280/229 |
| 2,708,119 | 5/1955 | Best | 301/1 |
| 3,717,361 | 2/1973 | Vanderpool | 280/229 |
| 4,588,232 | 5/1986 | Kim et al. | 301/1 |
| 4,602,822 | 7/1986 | Kim et al. | 301/1 |

Primary Examiner—Robert B. Reeves
Assistant Examiner—Joseph D. Pape

[57] ABSTRACT

A hub of a bike or multiple-wheel cycle is formed with an eccentric wheel or axle in the hub and the eccentric axle having a chain sprocket thereon rotatably mounted with a spindle fixed on a frame fork so that upon the rotation of the axle, the hub and any rear or front wheel secured on the hub will be rotated eccentrically to cause a cam-like action to mimic a horse-riding so as to spur the player or rider interest.

3 Claims, 3 Drawing Sheets

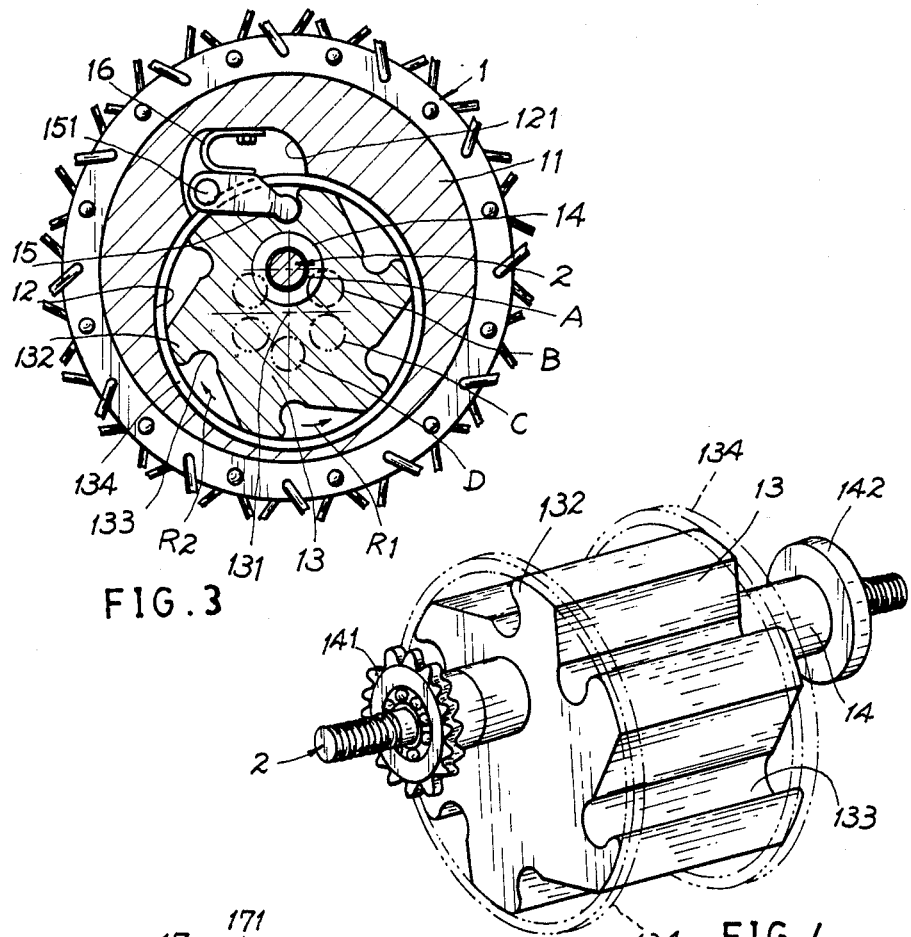
FIG.3
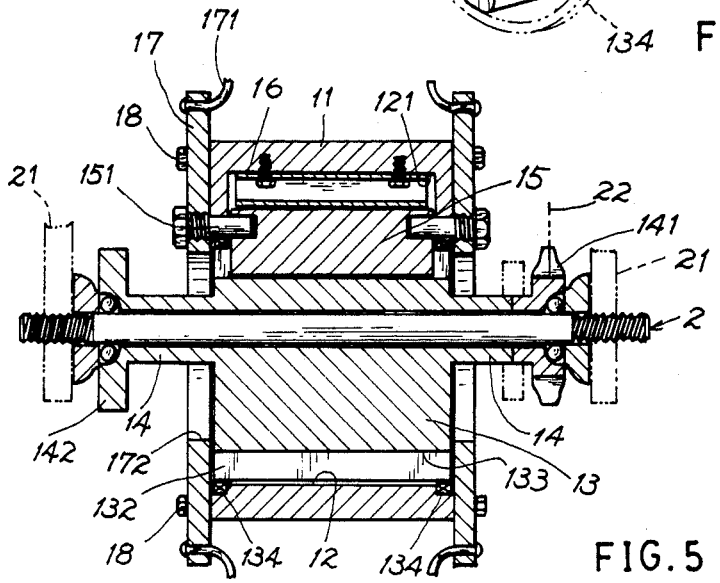
FIG.4
FIG.5

AXLE-VARIATING MEANS FOR ECCENTRIC AND CONCENTRIC WHEEL

BACKGROUND OF THE INVENTION

A conventional bicycle is driven for a circular movement of either its front wheel or rear wheel and can not perform a cam-like action to mimic a horse-riding. So, the traditional circular movement of the bike wheels will be easily bored by a bike rider or player. It is therefore expected to provide a bike having a cam-like wheel with variable axle to mimic a horse-riding movement to spur a bike rider's interest.

SUMMARY OF THE INVENTION

The object of the present invention is to provide an axle-variating means for a wheel, especially for a bike wheel, wherein a wheel hub is formed as an eccentric wheel, adjustable for running eccentrically to imitate a horse-ride action or for running concentrically to perform a circular movement as usual.

BRIEF DESCRIPTION OF THE DRAWINGS

FIG. 3 is a partial cut-away illustration of a wheel hub of the present invention.

FIG. 4 is a perspective view of an eccentic wheel of the present invention.

FIG. 5 is a sectional drawing of the present invention.

DETAILED DESCRIPTION

Figure 1:
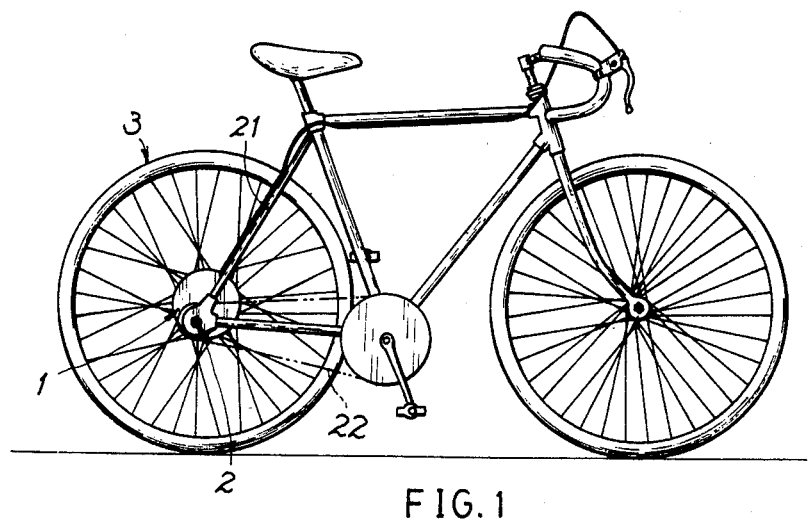
FIG. 1 is an illustration showing the present invention.
Figure 2:
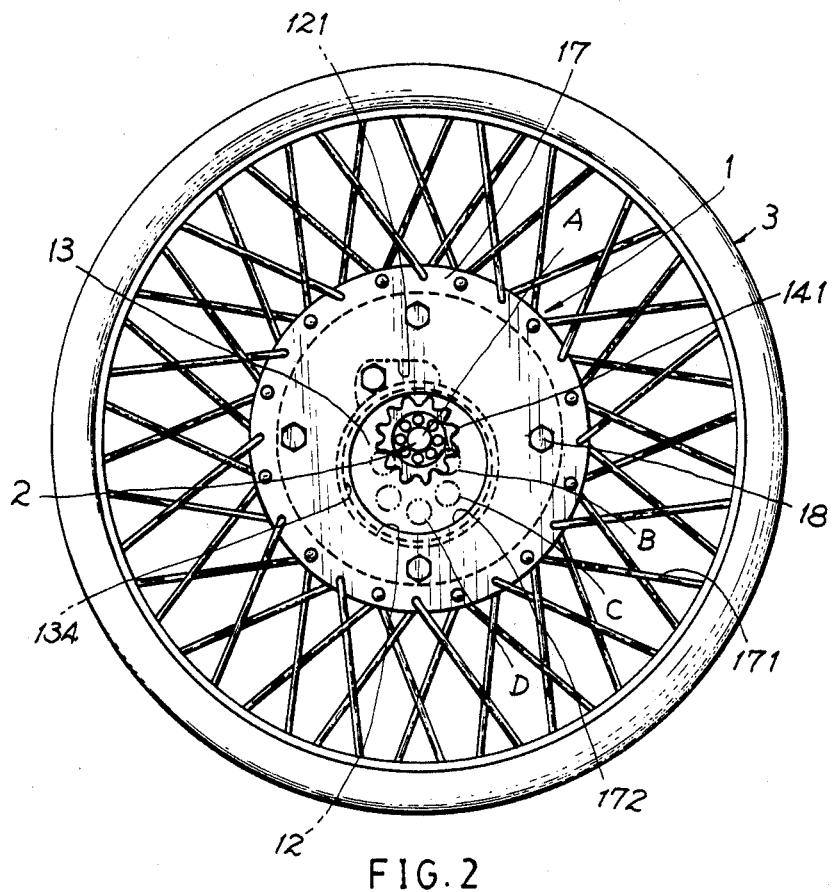
FIG. 2 shows a wheel provided with an axle-variating means of the present invention.

As shown in FIGS. 1-5, the present invention comprises: a hub 1 having an eccentric wheel 13 eccentrically formed in the hub 1, and a tubular axle 14 fixed on the eccentric wheel 13 and pivotally mounted on a spindle 2 fixed on a fork 21 of a rear wheel 3 or a front wheel 4 of a multiple-wheel cycle, such as a bike.

The hub 1 includes: a cylindrical block 11 having a round hole 12 formed through the transverse thickness of the block 11 and formed eccentrically with the block 11, an eccentric ratchet wheel 13 rotatably formed in the round hole 12 having a tubular axle 14 extending transversely from the wheel 13 rotatably mounted on the spindle 2, a pawl 15 operatively engaging the wheel 13 and resiliently retained by a restoring spring 16 fixed in a socket 121 radially recessed from the round hole 12, a pair of hub disks 17 fixed on two opposite sides of the block 11 by plural bolts 18 and each disk 17 perpendicular to a perimeter of the block 11 and each connected with a spoke 171 of either rear or front wheel 3 or 4. Each disk 17 is formed with an axle hole 172 slightly smaller than the round hole 12 to allow the assembly of the two disks 17 with the block 11 by passing a sprocket 141 and a brake drum 142 respectively formed on both sides of the axle 14.

The eccentric ratchet wheel 13 is formed with plural ratchet teeth 132 each tooth 132 being angled counter-clockwise as shown in FIG. 3 and formed with a recess 133 to be caught by the pawl 15 pivotally mounted in the two disks 17 by a pin 151, when rotated in direction R1 by the axle 14 as pedalling the chain 22 wound on the sprocket 141. The axle 14 as extending from the ratchet wheel 13 may be aligned with an axis of the spindle 2 when the axle 14 is positioned at the center of the hub 1 as shown in position A of FIG. 3. The wheel 13 has a center 131 eccentric to the axis of the spindle 2 as shown in FIG. 3 to have an eccentric motion of the present invention. On the rim of the wheel 13, there is provided with two bearing rings 134 to ensure smooth rotation of the wheel 13 within the round hole 12.

When the wheel 13 is rotatably adjusted to be at position A as shown in FIG. 3, the hub center is aligned with the spindle axis so that the rear wheel 3 (or front wheel 4) will be rotated in a normal circular movement as a usual bicycle by engaging the recess 133 with the pawl 15 in a direction R1 as shown in FIG. 3.

When rotating the axle 14 and wheel 13 in direction R2, each tooth 132 will be clickingly slipped or released from the pawl 15 without being engaged, and the axle 14 will be selectively moved to be at position B or C or D to deviate the axis of spindle 2 (pivotally mounted within the axle 14) eccentrically from the hub center so that the rear wheel 3 or front wheel 4 is rotated eccentrically to mimic a horse-riding movement.

When normally driving the wheel 3 in direction R1, the bike can be running frontwardly. However, since the ratchet wheel 13 can be rotated clockwise (R2), the sprocket 141 should be well designed to allow its free rotation, when backwardly pedalling of chain 22, without coupling ratchet wheel 13 to thereby prevent an unwanted rotation in direction R2 and prevent unwanted adjustment of eccentric wheel 13. The spindle 2 is always fixed on fork 21 of a bike frame ragardless the selective adjustment position of the eccentric wheel 13 within the hub 1 so that the length of chain 22 can be a constant.

Figure 6:
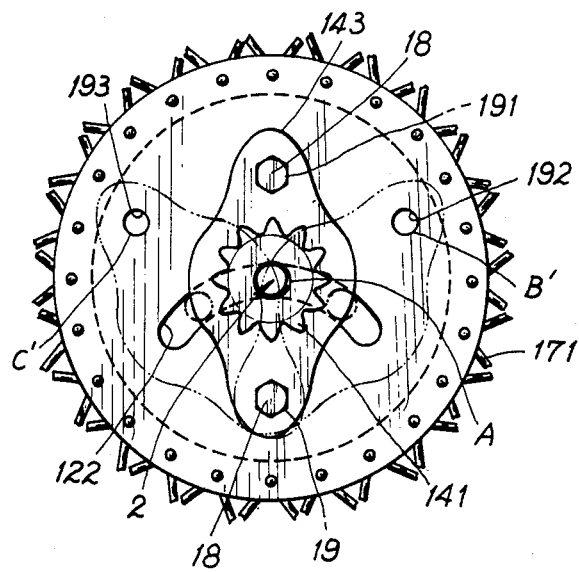
FIG. 6 shows another preferred embodiment of the present invention.
Figure 7:
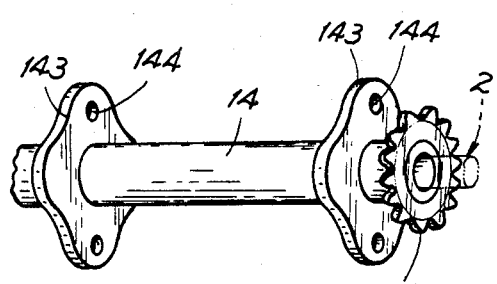
FIG. 7 shows a tubular axle of the embodiment as shown in FIG. 6.
Figure 8:
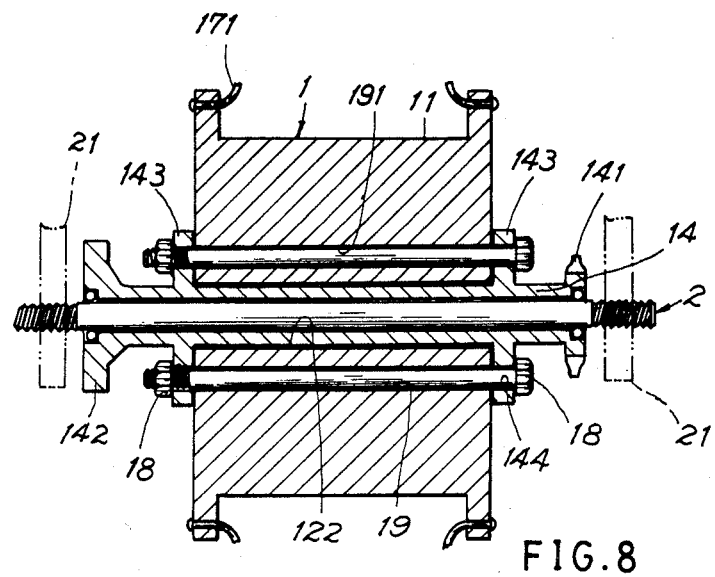
FIG. 8 is a sectional drawing of the embodiment of FIG. 6 in accordance with the present invention.

Another preferred embodiment of the present invention is shown in FIGS. 6-8, which comprises: a hub 1 made as a cylindrical block 11 secured with a spoke 171 of a rear or front wheel 3 or 4 of a multiple-wheel cycle, a tubular axle 14 adjustably mounted in an arcuated through hole 122 formed in a central portion of the block 11 and spindle 2 rotatably mounted in the axle 14 and fixed on a fork 21 of the cycle having a chain wound on a sprocket 141 formed on the axle 14.

The tubular axle 14 is formed with a pair of flanges 143 disposed on two opposite sides of the axle 14 each drilled with an upper and a lower bolt holes 144 thereon. The block 11 is drilled with a lower bolt hole 19 aligned with a center of the hub 1 such as position A of FIG. 6, an upper bolt hole 191 aligned with the hub center and the lower hole 19, two upper side holes 192, 193 such as position B, C respectively disposed on two sides of the hole 191 concentrically to a "center" of the lower hole 19. The arcuated hole 122 is formed concentrically to the "center" of lower hole 19 and including a hub center located at its central point as position A of FIG. 6. By fixing two bolts 18 through the upper hole 191 and the lower hole 19 as shown in full line of FIG. 6 and through the bolt holes 144 of two flanges 143 of the axle 14, the axle 14 can be firmly fixed with the hub 1 by aligning the hub center with an axis of the axle and the spindle 2 so that the rear or front wheel 3 or 4 will be rotated in a circular movement as in usual bike running. By fixing the bolts 18 on either right hole 192 (position B') or left hole 193 (position C'), the hub center will then be deviated as eccentric to the axis of spindle 2 rotatably mounted in the axle 14 to have an eccentric movement for the hub 1 and the wheel 3 or 4 secured thereto. By the way, when it is intended to adjust for eccentric motion, the lower bolt is loosened and the flanges are radially moved along the "center" of the lower bolt hole 19 either rightwardly to position B' or leftwardly to position C' for an easier adjustment for eccentric movement.

What is claimed is:

1. An axle-variating means for eccentric and concentric wheel of a multiple-wheel cycle comprising: a hub having an eccentric wheel eccentrically formed therein and a tubular axle fixed on said eccentric wheel and pivotally mounted on spindle having a chain sprocket formed thereon and fixed on a frame fork of a rear or front wheel of the cycle, the improvement which comprises:

said hub including: a cylindrical block having a round hole formed through the transverse thickness of said block and formed eccentrically within said block, an eccentric ratchet wheel rotatably formed in said round hole having a tubular axle extending transversely from said ratchet wheel rotatably mounted on said spindle, a pawl operatively engaging and catching said ratchet wheel as resiliently held within a socket recessed from said round hole to allow said hub and its secured rear or front wheel as driven counter-clockwise when rotating said ratchet wheel counter-clockwise, or to rotate said ratchet wheel clockwise to deviate the axle and a spindle axis eccentrically to the hub center to thereby form an eccentric movement for said hub and a rear or front wheel secured thereto, and a pair of hub disks disposed on two opposite sides of said cylindrical block perpendicular to a perimeter of said cylindrical block to define the eccentric ratchet wheel therebetween.

2. An axle-variating means according to claim 1, wherein said eccentric ratchet wheel is formed with plural ratchet teeth each angled counterclockwise to form a recess operatively engaged with or caught by said pawl.

3. An axle-variating means comprising:

a hub including a cylindrical block formed with an arcuated throughhole defining a hub center therein on the central portion of said block, and formed with a lower bolt hole on the lower portion of said block aligned with the hub center formed in said arcuated hole, an upper bolt hole aligned with said hub center and two upper side bolt holes respectively disposed on two sides of said upper bolt hole concentrically to a center of said lower bolt hole, said arcuated hole being concentric to the center of said lower bolt hole; and a tubular axle, having a spindle rotatably mounted therein and having a chain sprocket formed thereon, formed with two flanges disposed on its two opposite sides each flange being drilled with an upper bolt hole and a lower bolt hole adapted to be fixed on said cylindrical block by fixing bolts through said upper and lower bolt holes of said flanges and said upper and lower bolt holes on said block to align said hub center with an axis of said spindle for circular movement of the hub and the rear or front wheel secured to said hub; and upon the fixing of the bolts into said bolt holes of said axle flanges with either said upper side hole and the lower bolt hole of said block, said spindle axis will be eccentric to said hub center to have an eccentric movement for said hub and any wheel secured thereto.

* * * * *